United States Patent [19]

Richards et al.

[11] 3,909,544

[45] Sept. 30, 1975

[54] JUNCTOR ALLOTTER

[75] Inventors: Glenn L. Richards, Caledonia; Gaetano L. Spiriti, Rochester, both of N.Y.

[73] Assignee: Stromberg-Carlson Corporation, Rochester, N.Y.

[22] Filed: May 5, 1974

[21] Appl. No.: 448,288

[52] U.S. Cl. .......................... 179/18 FD; 179/18 FG

[51] Int. Cl. .......................... H04m 3/22

[58] Field of Search ....... 179/18 FD, 18 FE, 18 FG, 179/18 FF, 18 H, 15 AT; 340/147 C, 147 B

[56] References Cited

UNITED STATES PATENTS 3,836,725 9/1974 Celestini .......................... 179/18 FG

*Primary Examiner*—Thomas A. Robinson
*Attorney, Agent, or Firm*—Donald R. Antonelli; William F. Porter, Jr.

[57] ABSTRACT

An allotter, particularly one adapted to be used in a telephone system, is formed of a plurality of stages, each of which is associated with a prescribed type of utilization device, such as a junctor, tone receiver, register, etc. for which a request for access may be effected. Each allotter stage includes a pair of flip-flops for indicating whether the device associated with that stage is free and if it is the last device in a group which has been selected for allotment. The stages may be connected in groups for either homing or non-homing type of operation.

21 Claims, 6 Drawing Figures

JUNCTOR ALLOTTER

FIELD OF THE INVENTION

The present invention relates to an allotter which is capable of effecting a rapid selection of a piece of equipment from a pool of similar devices for allocation and/or assignment to a user. More particularly, the invention relates to the employment of an allotter in a telephone system which may be used with equipment such as tone receivers, senders, junctors, trunks, tie lines, registers, etc. In one exemplary embodiment, for a particular type of system, the present invention relates to a junctor allotter.

BACKGROUND OF THE INVENTION

In present day data handling systems, there is often the need for one portion of a system to have allocated to it a device, from among a pool or group of devices, for carrying out a specific function. For example, in a time sharing computer system, requests are continuously being made for blocks of memory, disk packs, printers, etc. Taking a group of printers, for example, the requesting portion of the system may not necessarily request a specific printer, but only desires a connection with any printer for visual readout.

Similarly, in present day telephone systems, when a calling party desires to call another party, during the set up of the call, a check is made to determine whether or not there is a local junctor available for the seizure of a trunk, in order to permit connection of the called party. The calling party may not care what junctor is selected, as long as a junctor is allocated for completion of the call. Typically, a plurality of junctors are provided and each junctor may be selectable for setting up a call.

Now, during the operation of the telephone system, at any given time, any device among a pool or group of similar devices will either be free or occupied and the portion of the system which requests a device will be requesting a device which is available for immediate use.

OBJECTS OF THE INVENTION

For this purpose, the present invention has been developed and, in particular, is principally concerned with a device for allotting a free device among a group or pool of devices for use by a requesting portion of the system. In accordance with the present invention, the device makes it possible to not only seize a free device, but provides an indication of whether or not a device is free, without actually assigning the device to the requesting portion of the system.

BRIEF DESCRIPTION OF THE INVENTION

With respect to telephone communication systems, especially in connection with junctor allotment, the present invention includes an allotter having a plurality of stages, with each stage being associated with a particular device which can be allotted to a requesting user of the device. The devices may be provided in pools or groups, so that the corresponding stages of the allotter equipment can be appropriately designated in corresponding pools or groups.

In one particular use, where allotment of junctors is afforded, a plurality of multi-stage allotter modules are arranged in cascaded fashion and can be addressed sequentially in time in accordance with sequential clock pulsing, or can be strapped together in prescribed groups for selective allotment.

In a preferred embodiment of the components making up an individual allotter stage, per se, first and second flip-flops are interconnected with associated gating circuitry for providing respective outputs, indicating whether or not an allotment has been made for that particular stage/device, or whether that particular stage/device is "free" and can be assigned to a requesting party. Also, where the device associated with a stage has been allotted, the circuitry of that stage will have been so set up as to cause any request for allotment received at that stage to be transferred to a subsequent stage.

For a better understanding of the present invention, the following description will be presented in connection with the accompanying drawings.

DETAILED DESCRIPTION OF THE INVENTION

General Allotter

Figure 1:
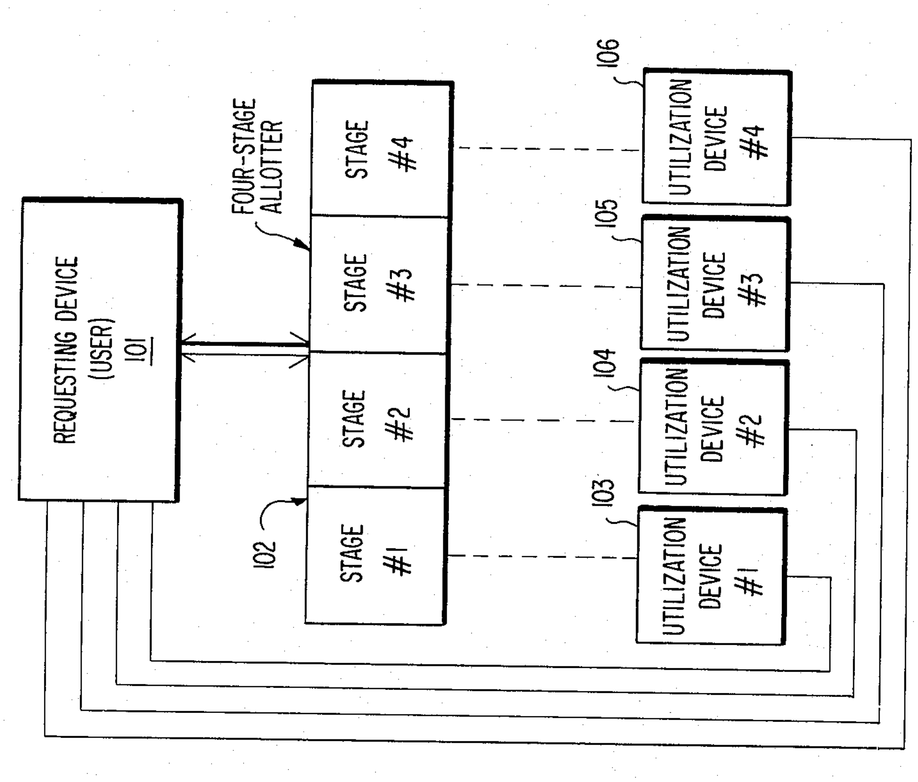
FIG. 1 is a block diagram depicting the general format of the allotter and its interconnection with a requesting device and a utilization device in accordance with the present invention.

With attention now directed to FIG. 1, in accordance with the basic construction of the present invention, there is a multi-stage allotter which, in FIG. 1, is shown as a four-stage allotter 102 (the number of stages is not limited to four) which is connected to a requesting device 101. Associated with each stage of the allotter is a respective utilization device 103–106 which may be seized and connected selectively to the requesting device, For example, in a time-shared computer system, during the operation thereof, it may be desired to seize a utilization device, such as a printer, disk pack, etc. Moreover, the system may not have a preference for any particular printer, as long as there is one allocated to providing a printed readout when a request is made.

In accordance with the present invention, the allotter 102, upon receiving a request for a utilization device, will indicate to the requesting device whether or not a utilization device is free or is occupied, and will provide an output indicating which utilization device, in accordance with a selected order of sequence, is available for use.

Assuming, for example, that utilization device No. 1-103 and utilization device No. 2-104 have been allotted to a portion of the requesting device 101, if a request from the requesting device 101 is given to the four-stage allotter, the allotter will indicate, by way of stages No. 1 and 2 that utilization devices 103 and 104 associated therewith are not free. Furthermore, if it is assumed that utilization devices No. 3 and 4, 105 and 106, are free, then stages Nos. 3 and 4 of the four-stage allotter will provide output signals indicating that the devices with which they are associated are free and can be assigned to the requesting device. In one exemplary arrangement, where the four-stage allotter proceeds from one stage to another in numerical sequence, stage No. 3, being the first stage subsequent to stage No. 2 which has a free device associated therewith, will indicate to the requesting device 101 that it may have utilization device No. 3 - 105 allotted thereto. Stage No. 3 will not necessarily assign utilization device No. 3-105 to it, but will indicate to the requesting device 101 that it may seize this utilization device if it so desires. Then, if the utilization device 105 is assigned to the requesting device 101, the third stage of the allotter will provide an output indicating that the device with which it is associated has been the "last selected" device, so that, in response to a further request, the next inquiry made will be directed to stage No. 4.

General Allotter Stage

Figure 2:
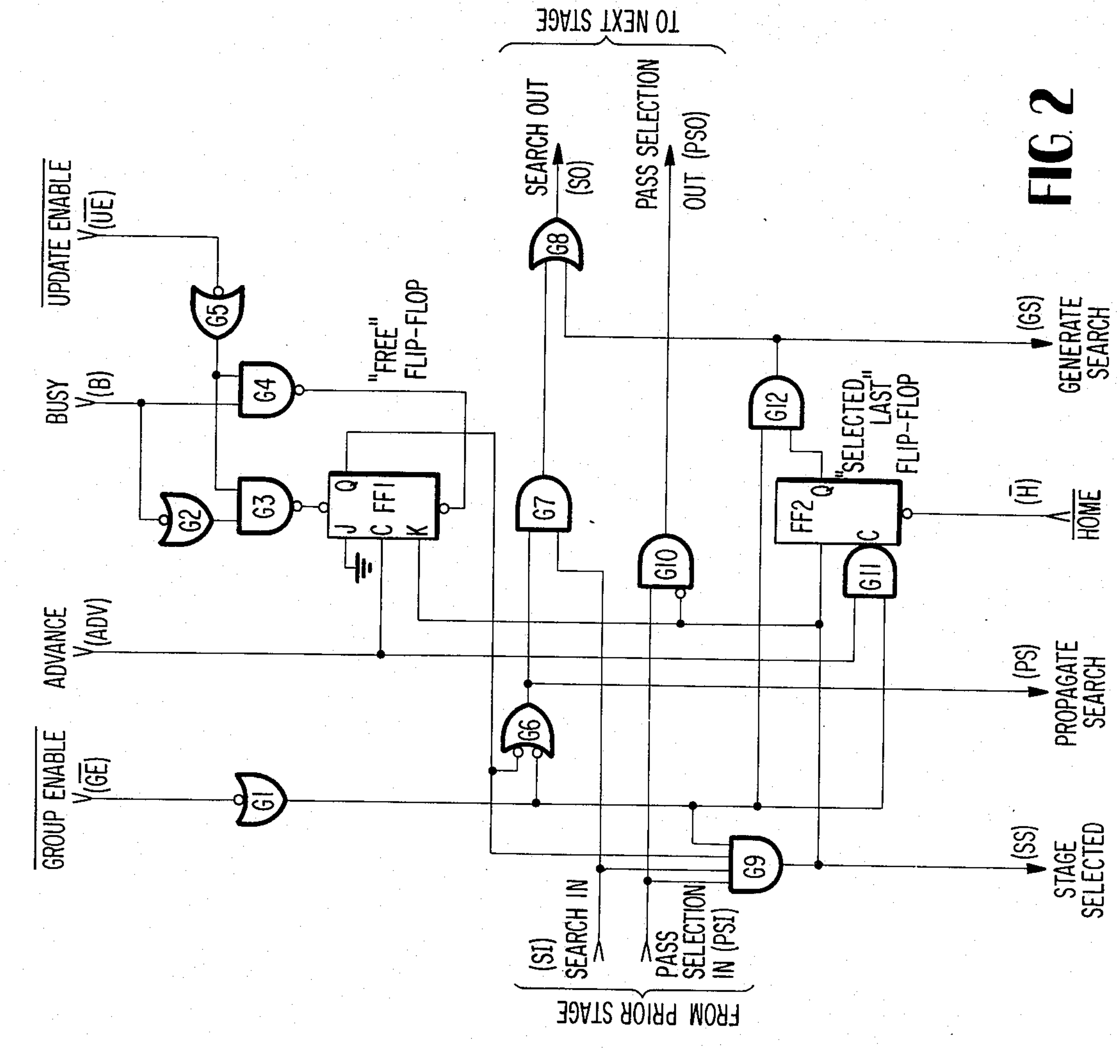
FIG. 2 is a detailed schematic illustration of the logic storage circuitry of an individual allotter stage of the present invention.
Figure 3:
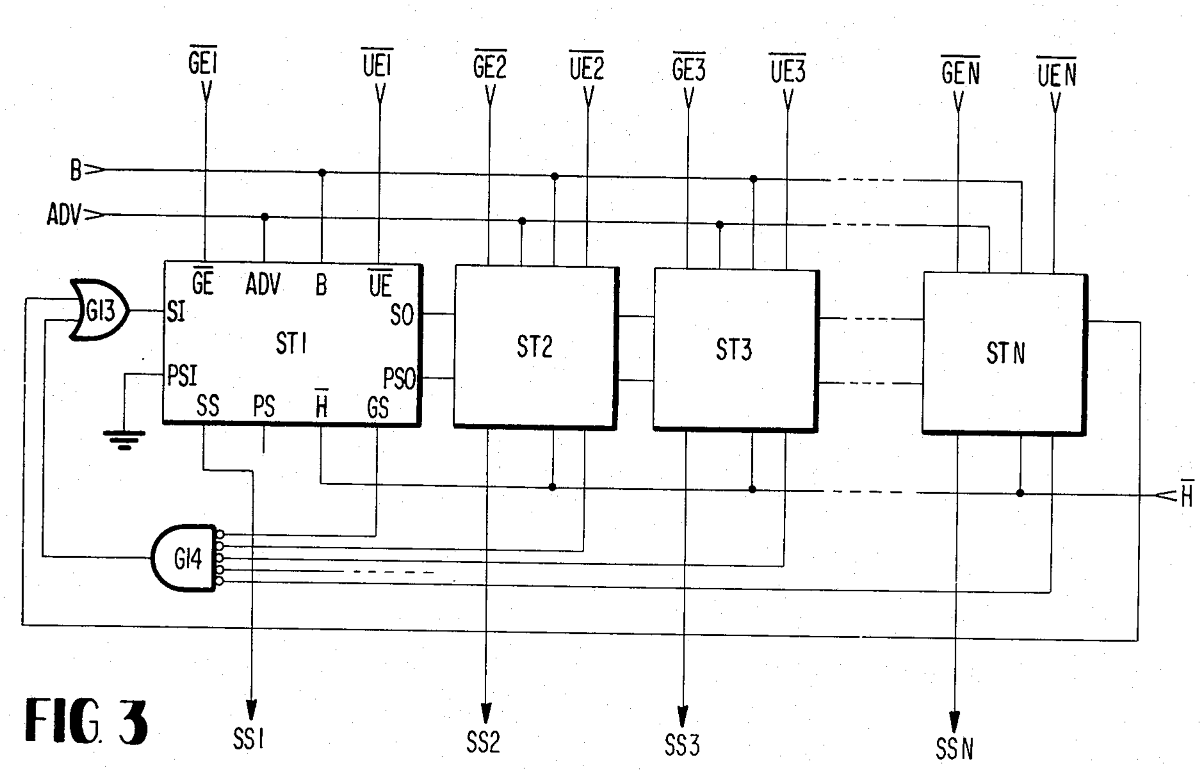
FIG. 3 illustrates, in block diagram form, the manner in which N-allotter stages may be cascaded to form a multi-stage allotter in accordance with the present invention.

For a more detailed explanation of the manner in which the above operation proceeds, attention is directed to FIGS. 2 and 3, FIG. 2 depicting a detailed logic circuit diagram of the components of an individual stage of the allotter, while FIG. 3 depicts the manner in which N-stages of an allotter may be cascaded together.

As is shown in FIG. 2, each allotter stage includes a first flop-flop FF1 designated the free flip-flop, and a second flip-flop FF2 designated the "selected last" flip-flop. When the first "flip-flop FF1 is in the "set" state, that stage of the allotter will provide an indication that the utilization device associated with it is free and can be assigned to a requesting device. On the other hand, if the utilization device has been assigned in accordance with a request made to the allotter with respect to that particular stage, the free flip-flop will be in the reset state and, through subsequent logic circuitry, will automatically cause the inquiring device to be transferred a further stage. As will be explained hereinafter, depending upon the type of connection between the stages, the search may be carried out sequentially among stages or non-sequentially in accordance with a prescribed interconnection pattern.

For providing input cascade connections between respective stages, there are a pair of lines SI for providing a search-in signal, and PSI for providing a pass-selection-in signal. For providing a connection to the next stage, a search-out line SO and a pass-selection-out line PSO are connected, respectively, to the outputs of OR gate G8 and AND gate G10.

Shown at the top of FIG. 2 are a plurality of further input lines, designated $\overline{\text{Group Enable (GE)}}$, Advance (ADV), Busy (B) and $\overline{\text{Update Enable (UE)}}$. In the lower portion of the figure are shown respective output lines for providing a "stage selected" signal (SS) a "propagate search" signal (PS) and a "generate search" (GS). A further input is designated $\overline{\text{Home (H)}}$ for clearing the selected last flip-flop FF2.

Allotter Stage Free Condition

Let it be assumed, now, that a utilization device for a particular stage of interest has not been allotted and is, therefore, free. Moreover, let it be assumed that both the searchin line (SI) and the pass-selection-in line (PSI) are high. With the flip-flop FF1 being in the set condition, since th utilization device associated with this particular stage is free, then three of the four inputs of the AND gate G9 will be in the high condition. When a requesting device desires to have a utilization device allotted thereto, a high potential will be supplied on the Group Enable leads of each stage whose associated devices meet the requirements of the requested allotment. In other words, the signal on the lead $\overline{GE}$ will be low, so that, by way of inverting gate G1, a further high input will be supplied to the AND gate G9.

At this point, it is to be observed that utilization devices of the same type and function are typically provided in groups and an inquiring device does not necessarily care which of the devices it has assigned to it, as long as it can be quickly be connected with a device. Thus, the term "group", as used with the Group Enable signal, is employed in this sense. As was indicated previously, because of the interconnection between the various stages, the various stages of a multi-stage allotter will selectively proceed in an orderly fashion to allot a device to an inquiring user. However, it should be emphasized that the allotter stages comprising a group may be any random selection of stages, and need not consist of successive stages.

With each of the inputs of AND gate G9 being high, there will be a high level on the line SS, the set side of the flip-flop FF2, and the reset side of the flip-flop FF1. Also, by way of the inverted input terminal, one of the inputs to AND gate G10 will be low, so that the output thereof will necessarily be low. As a result, the output level of pass selection out line PSO becomes low, thereby providing a low on the PSI input of the next stage.

With the output on the stage selected line SS, which is coupled to the user or requesting device, being high, the user is notified that the utilization device associated with that stage is free for assignment to it. In response to this notification, a high-going transition is supplied by way of the advance line ADV to the clock input of flip-flop FF1 and to one of the inputs of AND gate G11. Since the flip-flops are of the high going transition triggering type, the free flip-flop, which has a high level on its reset input, will now be reset, to cause a low output at the Q output thereof, thereby disabling AND gate G9.

As was indicated above, it was presumed that the device associated with the present allotter stage was free for assignment. Thus, with the output of NOR gate G1 being high and the level of the Q output of flip-flop FF1 being high, the output of gate G6 is low, thereby disabling AND gate G7. Therefore, if the Home lead is low, the selected last flip-flop will be cleared, so that the output of OR gate G8, i.e., the SO lead, will be low. As this particular stage is selected, the search-out and the pass-selection-out leads will be low, preventing subsequent stages from being selected.

In order to provide an orderly search among the N-stages of the plurality of stages making up a group, the Generate Search GS leads of each stage are connected by way of gates G14 and G13 to the search-in SI input of a selected stage which as shown in FIG. 3 is the first stage in the cascaded group ST1. The "search-out"

lead SO of the $N^{th}$ stage is also connected to gate G13. This type of connection "forces" the search-in input SI of the first stage ST1 to be high, so that, assuming that the search must begin someplace, where there are a plurality of free devices, the allotment inquiry will first go to stage ST1.

Allotter Stage "Not-Free" Condition

In the discussion above, it was presumed that the allotter stage of interest was associated with a free utilization device. Let it be assumed, on the other hand, that the device associated with a particular allotter stage has already been assigned to a requesting device. Under such circumstances, the free flip-flop will be in the reset state, thereby providing a high level at the output of gate G6 and the input of the AND gate G7. With the search-in line SI being high (assume here that we are dealing with the first stage ST1 shown in FIG. 3, whose input SI has been forced into a high condition), then the output of AND gate G7 will be high, thereby providing a high output on the search-out lead SO by way of OR gate G8. The low level at the output of AND gate G9 will be inverted into a high level at one of the inputs of the AND gate G10 and the high level on the pass-selection-input of the first stage will force the output of the AND gate G10 to be high, so that both search-out lead SO and the pass-selection out lead PSO will be high, thereby providing a pair of high levels on the input of the gate G9 of the next stage. If the next stage (stage ST2, shown in FIG. 3) is associated with a free device, then, in response to a Group Enable high level at the output of gate G1 in that stage, and with the Q output of the flip-flop FF1 also being high, there will be a high level input on all of the inputs of AND gate G9 so that the process discussed above in connection with a free device will take place for stage ST2.

On the other hand, if the second stage ST2 is associated with an already assigned or not free utilization device, the search will be passed on to the third stage, and so on, until a free device, assuming that one of the devices in the group is free, is allotted. Thus, the equipment can be allotted in a line (with no waiting), thereby eliminating the need to preallot equipment. Moreover, non-homing allotment equalizes wear on electromechanical equipment.

If the Home lead is held high, the selected last flip-flop will be set in each group for that device and only that device which was last allotted to a user from that group. The stage in a group whose selected-last flip-flop FF2 is set will have its search-out SO lead high, so as to initiate the same searching process described above in connection with the beginning of the process at the first stage ST1 in response to a subsequent allotment request.

If, for any reason, there is more than one selected last flip-flop in a group in the set state, there is no problem, since the pass-selection lead PSO will block all selections other than the "first" one. After the allotter has been advanced one time, there will be, at most, one selected-last flip-flop FF2 set in a group.

Furthermore, because of the order of selection described above, there is no need for a power-on-clear of the selected last flip-flops and the groups can be dynamically changed during the operation of the system.

In addition to the gate control signals discussed above in connection with the operation of FIG. 2, additional input signals may be supplied thereto by way of "Busy" (B) and Update Enable ($\overline{UE}$) leads. More specifically, once a device has become free the allotter stage associated therewith will be updated. Namely, by way of gates G2-G5, flip-flop FF1 will be set, to indicate that the device associated with that stage is free.

Similarly, in a telephone system, where the utilization device may be a junctor, and a junctor has been allotted for a trunk connection if the line circuit of a called subscriber associated with the trunk is busy, there will be no need for the junctor for setting up the connection, so that a signal over the lead (B) will also serve to free the allotter stage and, consequently, the junctor associated therewith for incoming requests.

Large Scale Allotment

Figure 4:
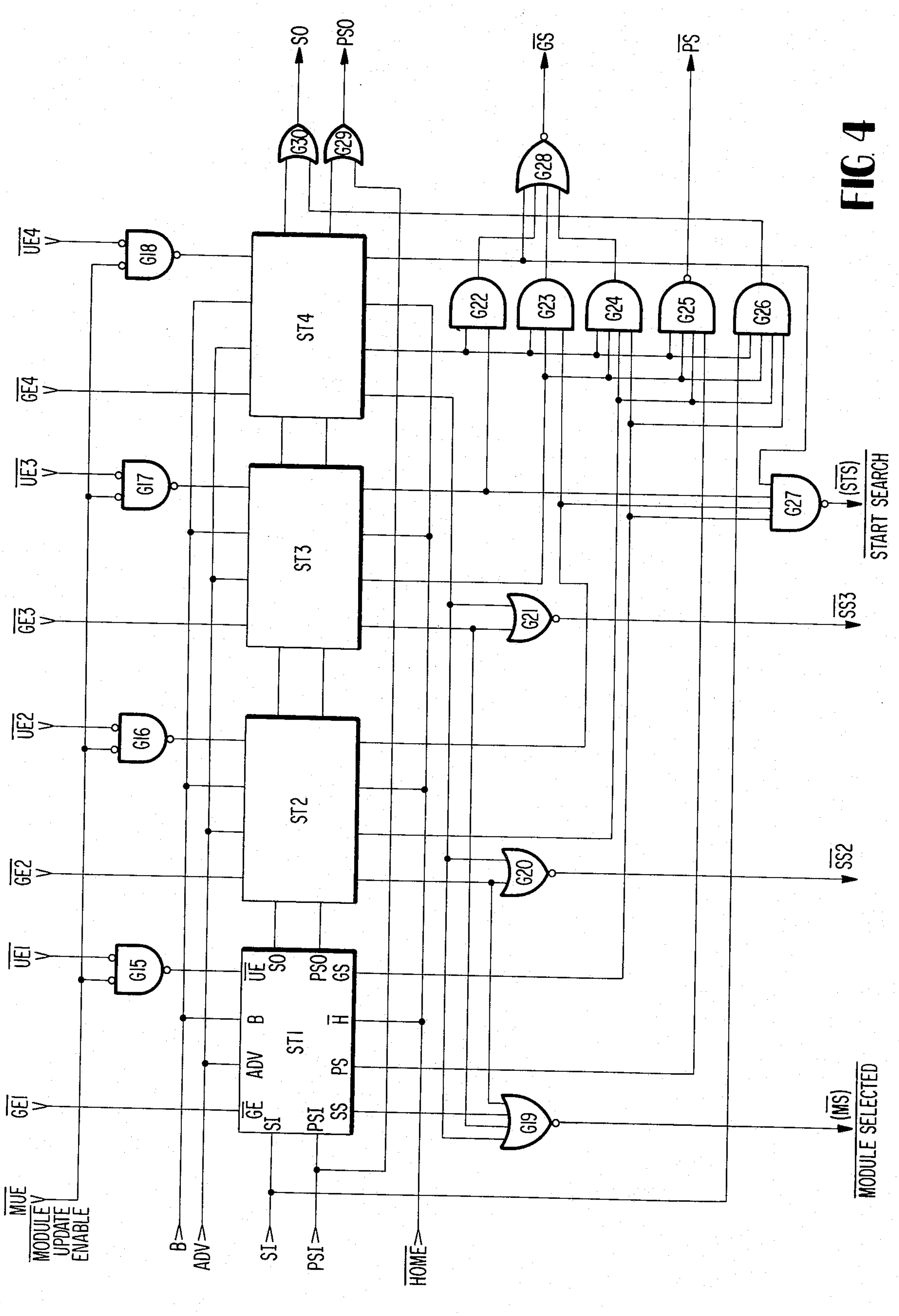
FIG. 4 is an illustration of a multi-stage allotter having four stages which may comprise an allotter module which may be incorporated into a large-scale allotter system.

For a large number of utilization devices, a large-scale allotter system is necessary. Fr this purpose, a plurality of 4-stage allotter modules may be connected in a cascaded or matrix fashion. As is shown in FIG. 4, one of the four-stage allotter modules comprises stages ST1-ST4 in the cascade arrangement depicted in FIG. 3 discussed previously. In addition, to permit the stages to be XY addressed, a "$\overline{\text{module update enable}}$" input (MUE) is connected by way of gate G15-G18 of the respective stages ST1 ST4. Furthermore, a "$\overline{\text{module selected}}$" output and respective encoded outputs $\overline{SS2}$ and $\overline{SS3}$ permit a selected stage to be encoded into binary form using a standard priority encoder. Additional gates G19-G28 are connected to the "stage selected", "propagate search" and generate-search outputs of the stages ST1-ST4 to provide respective output signals for the four-stage module. The gate G27 provides a "start search" output in the same fashion that gate G14 is employed to force a search to begin at a particular stage, as described in connection with FIG. 3.

As with any free propagating circuit, if a large number of stages are employed, the propagation delay per stage must be taken into account. In the multi-stage allotter in accordance with the present invention, there are a pair of freely propagating signals. These signals are the "pass-selection" and the search signals on leads SO and PSO discussed previously. The PSO signal always propagates once it is generated so that it can be simply connected by way of OR gates into subsequent stages, as is effected in the arrangement shown in FIG. 3, to provide whatever propagation delay is desired. The search SO lead has a bypass path built into it, so that if all of the stages propagate a search, the search will propagate in two gate delays. If this is insufficient, the generate-search GS and propagate search PS leads for the four stages are provided, so that a standard "look-ahead" carry generator can be employed. It is to be noted, moreover, that with a look-ahead carry generator and with proper use of pull-ups, the allotter can be made such that the stages can be removed for servicing while the system is in operation.

Junctor Allotter

Figure 5:
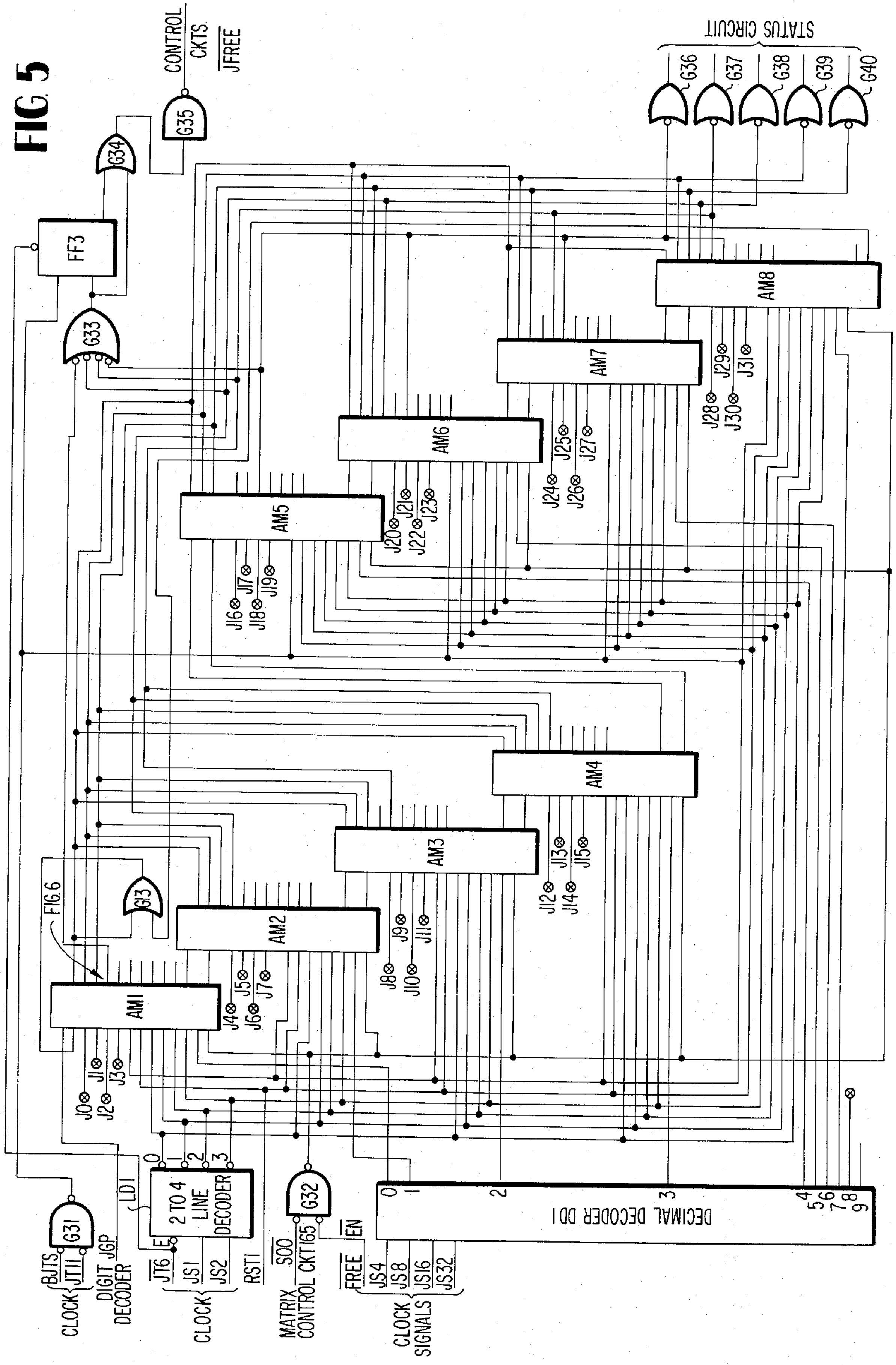
FIG. 5 is a schematic block diagram illustration of a junctor allotter employing the basic allotter module of FIG. 4.

FIG. 5 depicts a matrixing arrangement of the multi-stage (four stages) allotter modules shown in FIG. 4, employed as a junctor allotter in a telephone system. This junctor allotter is suitable for use in the system described in copending application Ser. No. 431,928 entitled, "Electronic Private Automatic Branch Exchange", by Uwe A. Pommerening and Glenn L. Richards, filed Jan. 9, 1974, and assigned to the assignee of the present application.

As is shown in FIG. 5, there are a plurality of allotter modules AM1–AM8 cascaded in sequence, so as to provide, by way of the four stages per allotter, and the arrangement of eight allotters, the possibility of allotting up to 32 junctors, in response to service requests. The Update Enable, Busy, Advance and Home input leads of each allotter module are connected in parallel. The pass-selection and search outputs are connected in cascade, in the same fashion described above in connection with FIGS. 3 and 4. For example, the output leads PSO and SO of allotter module AM1 are connected to the corresponding input leads PSI and SI of allotter module AM2.

Figure 6:
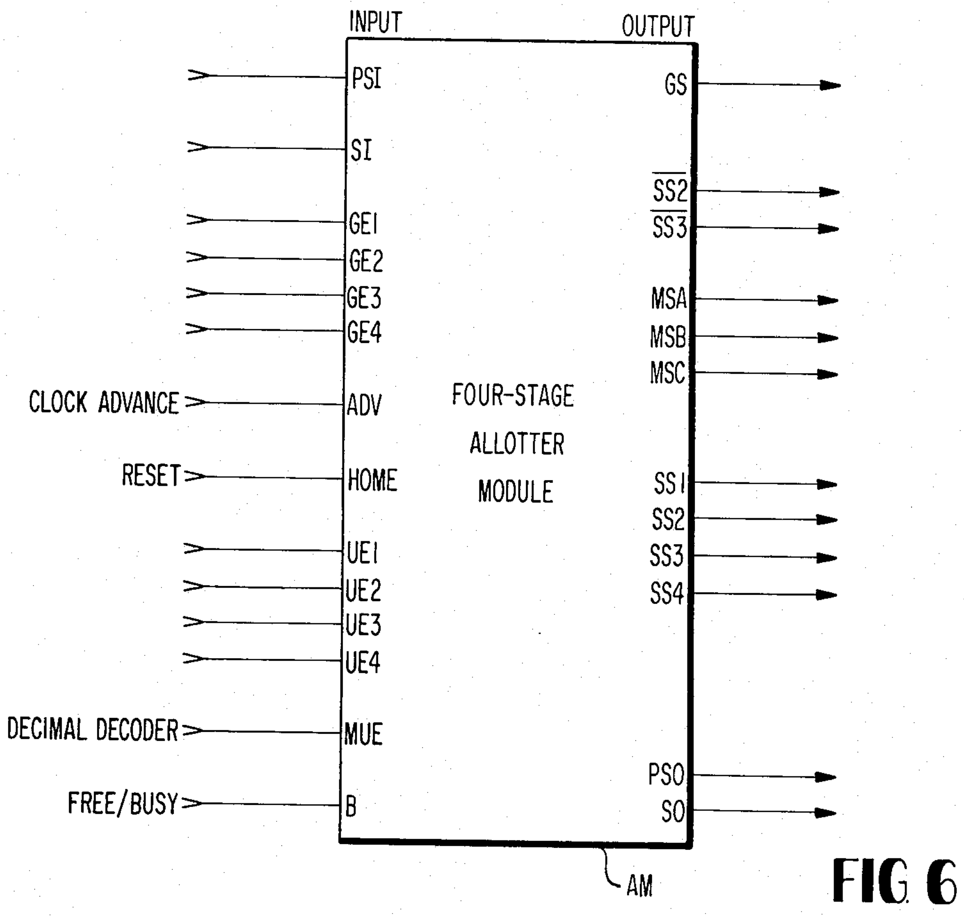
FIG. 6 is a schematic block diagram illustration of the input and output connections of a four-stage allotter module illustrated in FIG. 4, and connected in the cascaded format in the junctor allotter of FIG. 5.

In order to facilitate an understanding of the terminal connections of the inputs and the outputs of the four-stage allotter modules AM1–AM8 of FIG. 5, attention is directed to the block illustration of FIG. 6, which shows the input and output connections of the four-stage allotter modules which have the configuration as illustrated in FIG. 4, with each stage containing the flip-flop and gating circuitry shown in FIG. 2, previously described. The only difference in the terminal designations between FIGS. 4 and 6 is the use of the reference characters MSA, MSB and MSC. Effectively, these connections are parallel connected inverter circuits (single input/output NOR gates, e.g.) connected to the output of gate G19 of FIG. 4. Also, the designation "Reset" is for applying a clear signal to the selected-last flip-flops FF2 of each stage of the allotter modules, at the respective "home terminals" thereof.

Also, shown in FIG. 5 is a decimal decoder which receives four sequentially divided-by-two clock pulse signals for conversion into decimal format for selecting an appropriate allotter module on output terminals 0–7. The two decoders LD1 and DD1 are for the purpose of addressing FREE flip-flops for updating their condition with data supplied on the $\overline{\text{SOO}}$ and $\overline{\text{FREEEN}}$ inputs. Output terminal 8 is provided for homing type junctor hunting, in place of the reset signal for sequential junctor hunting normally applied on line RST1. If non-homing type junctor hunting is desired, the reset signal (a constant positive level) is applied to line RST1.

As was indicated previously, the respective stages of the allotter modules of the junctor allotter may be sequentially addressed or may be connected for group hunting. For sequential addressing respective digit decoder address signals are applied to terminals JO–J31 for the Group Enable inputs of the respective stages. On the other hand, the Group Enable leads of selected allotter stages may be strapped to associated trunk groups with selected junctors. This will permit the standard technique of dialing 9 to gain access to a free trunk associated with selected junctors. What is done, typically, is to initially strap the selected junctor stages to selected digit decoder positions. Because of the versatility of the present system, however, any type of strapping may be employed. For example, if desired, a single group of eight allotter modules could be connected in a completely non-sequential fashion, or only a portion of the allotter modules could be so connected. On the other hand, all of the group enable inputs could be strapped sequentially to the outputs of the digit decoder for 32 sequential scans.

Binary junctor time signals and clock signals are supplied by way of gate G31 to flip-flop FF3 for controlling the application of a module selected signal to an output line $\overline{\text{JFREE}}$ by way of gates G33, the reset side of flip-flop FF3, gate G34 and gate G35 to provide a "junctor-free"signal. In the telephone system of the above-referred to application, this line is connected to the control circuits 110.

The Update Enable inputs of each of the allotter modules are connected to the output of a "2 to 4" line decoder LD1 which receives respective clock signals JS1 and JS2, one of which is a double multiple of the other for updating the status of the lines with which the junctors may be associated. A clock pulse signal $\overline{\text{JT6}}$ occupies the seventh time frame of 16 time frames within each of the 34 time slots of the system for enabling the line decoder LD1 and clearing the flip-flop FF3, while the llth time slot signal JT11 is applied to gate G31 to provide the advance signal for resetting the free flip-flop of the respective stages of the allotters. The signal $\overline{\text{JT6}}$ is also used to enable the inputs to the FREE flip-flop selected by the two decoders, LD1 and DD1, to set or reset the FREE flip-flop as determined by the respective states of the $\overline{\text{SOO}}$ and $\overline{\text{FREEN}}$ signals. In addition, when the signal JT11 is enabled at G31 it loads FF3 with the information that a free junctor is available (if that is the case) and triggers the allotter to advance to the next available free junctor.

The digit decoder also has an output "JGP" connected to the pass-selection input PSI of the first stage of the first allotter module AM1 which controls whether or not a search for a free junctor can be made. Gate G32 is supplied with a free enable input and the zero status input from the matrix control circuit 165 ias shown in FIG. 1*b* of the above-referred to application. The signal on line $\overline{\text{SOO}}$ indicates a "junctor is not in use" status, while the free enable input supplies a signal to prevent setting the free flip-flop of each stage if that junctor is to be removed from service. The stage-selected outputs MSA-MSB, $\overline{\text{SS2}}$ and $\overline{\text{SS3}}$ are connected by way of respective gates G36–G40 to the memory circuit of the telephone circuit described in the above referred to application for supplying thereto address signals for storing call data associated with the allotted junctor.

This, in connection with the operation of the system of FIG. 5, as was explained above, the allotter of the present invention is employed for the purpose of allotting junctors, either through sequential scan or selected homing type junctor hunting, in accordance with the manner in which the group enable inputs of the respective allotter modules are strapped to the digit decoder. The operation of each allotter module proceeds in the same fashion as described above in connection with FIGS. 1–4, so that up to 32 allotter stages, each associated with a respective junctor, will provide to the control circuit an indication of the status of each junctor and will make it possible to assign a free junctor upon request.

It will be appreciated, of course, that the number of stages per allotter is not necessarily limited to four nor is the number of allotter modules cascaded together necessarily limited to eight. In the embodiment of the junctor allotter shown in FIG. 5, eight four-stage allotter modules provide allotment facilities within the 32 time slots of the clock signals employed in the telephone system referred to above.

While we have shown and described several embodiments in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as are obvious to one of ordinary skill in the art.

We claim:

1. In a telephone system having a plurality of junctors, to individual ones of which a request for connection may be allotted, a junctor allotter, which, in response to an allotment request, enables a free junctor to be allotted for connection, said junctor allotter comprising:

a plurality of stages, each of which is associated with a respective junctor, for which a connection request can be made, each stage including first means for storing information representative of the free or busy state of the junctor associated with that stage and, in response to a request for a connection with a junctor, for providing a first signal representative of whether or not the junctor associated with that stage is free; and second means, responsive to said connection request, and in response to the condition that the junctor associated therewith is not free, for transferring said request to another stage.

2. A junctor allotter according to claim 1, wherein said first means comprises a first bistable storage device which is maintained in a first state during the period of time in which the junctor is free, and is placed in a second state upon said junctor being allotted in response to a connection request.

3. A junctor allotter according to claim 2, wherein said first means further includes a first logic circuit means, coupled to an output of said first bistable storage device and responsive to a junctor request signal, for providing said first signal.

4. A junctor allotter according to claim 3, wherein said first logic circuit means is further connected to the second means of a preceding stage, for providing said first signal only in response to the transfer of said request by said preceding stage.

5. A junctor allotter according to claim 2, wherein said first means further includes means for switching said first bistable storage device into said first state in response to the condition that the junctor has been made free.

6. A junctor allotter according to claim 2, wherein said second means includes a second bistable storage device which is placed in a first bistable state in response to the junctor being allotted, so as to cause a subsequent request for access to a junctor to be transferred to the next subsequent stage.

7. A junctor allotter according to claim 3, wherein said second means includes a second bistable storage device which is placed in a first bistable state in response to the junctor being allotted, so as to cause a subsequent request for access to a junctor to be transferred to the next subsequent stage.

8. A junctor allotter according to claim 7, wherein said second means further includes a second logic circuit means coupled to the output of said second bistable storage device and to the output of said first bistable storage device, for providing a second signal for causing said request to be transferred to said next subsequent stage.

9. A junctor allotter according to claim 1, wherein the stages of said plurality are connected in cascade and further including means, coupled between the second means of each stage and a selected one of said stages, for causing a request for access to a junctor to be initially directed to said selected one of said stages.

10. A junctor allotter according to claim 6, wherein the stages of said plurality are connected in cascade and further including means, coupled between the second means of each stage and a selected one of said stages for causing a request for access to a junctor to be initially directed to said selected one of said stages.

11. A junctor allotter according to claim 1, wherein the stages of said plurality are grouped in selectively cascaded stages in accordance with prescribed types of junctors, and further including means, coupled between the second means of each stage and a selected one of the stages in each group, for causing a request for access to a prescribed type of junctor associated with a respective group to be initially directed to said selected one of said stages.

12. In a system having a plurality of utilization devices, to individual ones of which connections may be allotted for a device requesting use of a prescribed type of utilization device, an allotter which, in response to an allotment request, enables a requesting device to be connected with said prescribed type of utilization device, said allotter comprising:

a plurality of stages, each of which is associated with a respective utilization device for which a connection request can be made, each stage including first means for storing information representative of the free or busy state of the prescribed type of utilization device associated with that stage and, in response to a request for a connection with a prescribed type of utilization device associated with that stage, for providing a first signal representative of whether or not the utilization device is free for access; and second means, responsive to said connection request and the condition that the utilization device associated therewith is not free for access, for transferring said request to another stage associated with said prescribed type of utilization device.

13. An allotter according to claim 12, wherein said first means comprises a first bistable storage device which is maintained in a first state during the period of time in which the utilization device is free, and is placed in a second state upon said utilization device being allotted in response to a connection request.

14. An allotter according to claim 13, wherein said first means further includes a first logic circuit means, coupled to an output of said first bistable storage device and responsive to a request signal from a requesting device, for providing said first signal.

15. An allotter according to claim 14, wherein said first logic circuit means is further connected to the second means of a preceding stage, for providing said first signal only in response to the transfer of said request by said preceding stage.

16. An allotter according to claim 13, wherein said first means further includes means for switching said first bistable storage device into said first state in response to the condition that the utilization device has been made free for access.

17. An allotter according to claim 13, wherein said second means includes a second bistable storage device which is placed in a first bistable state in response to the utilization device being alloted, so as to cause a subsequent request for access to said presecribed type of utilization device, with which that stage is associated, to be transferred to the next subsequent stage.

18. An allotter according to claim 14, wherein said second means includes a second bistable storage device which is placed in a first bistable state in response to the utilization device being allotted, so as to cause a subsequent request for access to said prescribed type of utilization device, with which that stage is associated, to be transferred to the next subsequent stage.

19. An allotter according to claim 18, wherein said second means further includes a second logic circuit means, coupled to the output of said second bistable storage device and to the output of said first bistable storage device, for providing a second signal for causing said request to be transferred to said next subsequent stage.

20. An allotter according to claim 12, wherein the stages of said plurality are connected in cascade and further including means, coupled between the second means of each stage and a selected one of said stages, for causing a request for access to a utilization device to be initially directed to said selected one of said stages.

21. An allotter according to claim 17, further including means, coupled between an output of the second bistable storage device of each stage and said first means of a selected one of said stages, for causing a request for access to a utilization device to be initially directed to said selected one of said stages.

* * * * *